United States Patent Office.

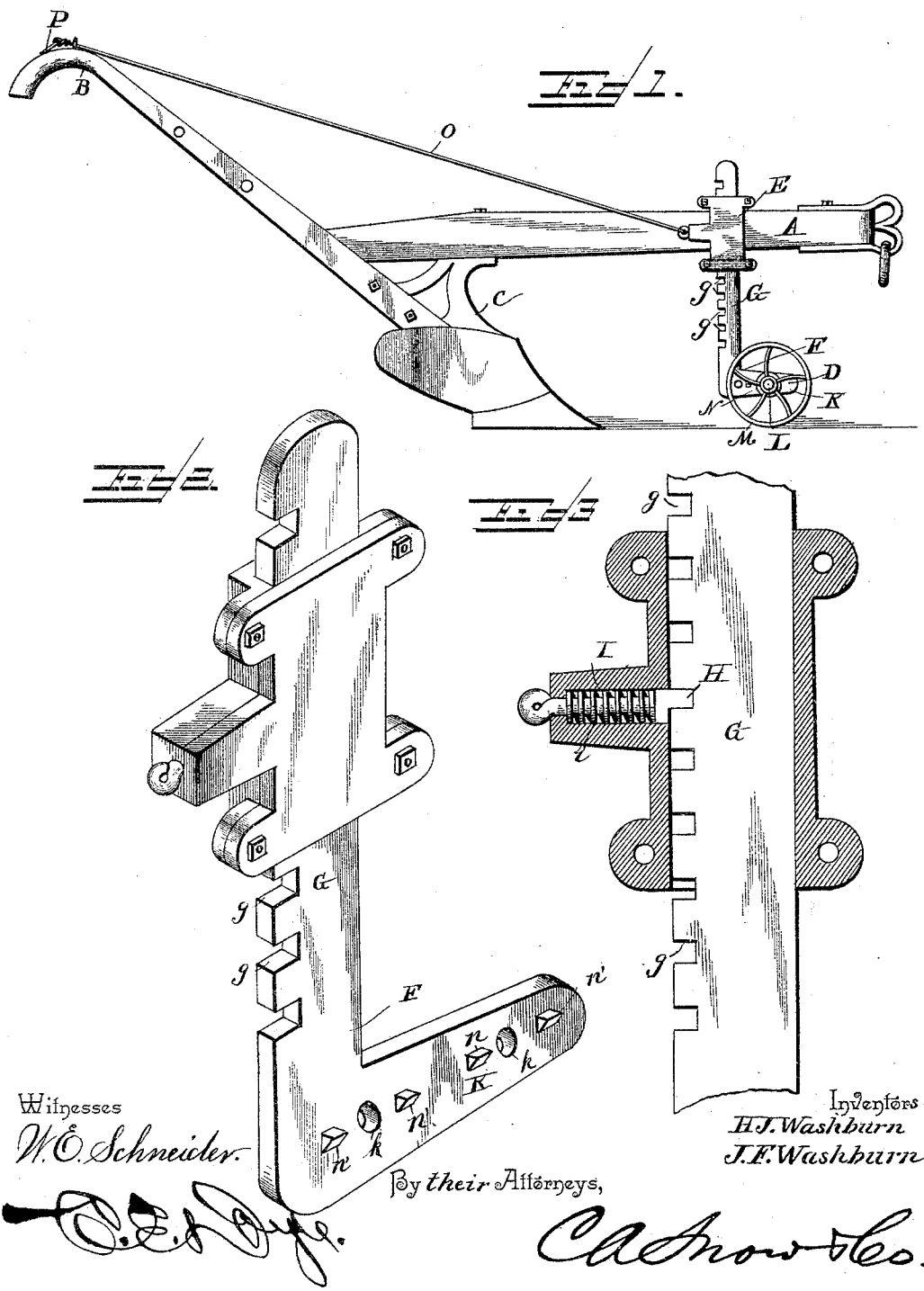

HELUM J. WASHBURN AND JOHN F. WASHBURN, OF RANSOMVILLE, NEW YORK.

PLOW-STANDARD.

SPECIFICATION forming part of Letters Patent No. 491,621, dated February 14, 1893.

Application filed August 26, 1892. Serial No. 444,163. (No model.)

*To all whom it may concern:*

Be it known that we, HELUM J. WASHBURN and JOHN F. WASHBURN, citizens of the United States, residing at Ransomville, in the county of Niagara and State of New York, have invented a new and useful Plow-Standard, of which the following is a specification.

Our invention relates to improvements in standards for the caster wheels used in connection with plow beams, and it has for its object to provide a simple and effective device whereby such standard may be raised or lowered, relatively to the plow-beam to vary the depth of the furrow.

A further object of our invention is to provide simple means for operating said standard to elevate or depress the front end of the plow-beam whereby the operator may change such adjustment without leaving the rear end of the plow or releasing the handles.

Further objects and advantages of our invention will appear in the following description, and the novel features thereof will be particularly pointed out in the appended claims.

In the drawings, Figure 1 is a side view of a plow provided with our improved standard; Fig. 2 is a detail perspective view of the standard and the casting or box through which the shank of the standard extends; Fig. 3 is a vertical sectional view of the box, through the spring actuated locking-pin, and showing a portion of the shank of the standard.

A represents the beam of an ordinary plow, B B the handles, C the plow standard, and D the caster-standard, or the standard upon which the caster-wheel is mounted and by which it is carried.

E represents a casting or box bolted to the side of the plow-beam near its front end, and F represents the standard, having a shank, G, which extends vertically through the casting or box and is provided at its rear edge with a series of notches, *g g*, to be engaged by a spring-actuated locking-pin, H, which is arranged horizontally in the rear side of the casting or box. This locking-pin is arranged in a socket, I, and is encircled by a coiled spring, *i*, which normally holds the nose of the pin in engagement with one of the notches in the shank of the standard.

At the lower end of the shank of the standard is the horizontal arm, K, provided with perforations, *k k*, to receive a transverse bolt, L, by which the caster-wheel, M, is attached to the standard. The box, N, of said caster is provided at its inner side with depressions, *n, n*, to receive small studs, *n' n'*, which are formed upon the horizontal arm of the standard at opposite sides, respectively, of the perforations above mentioned. The object of having more than one perforation for the attachment of the caster, is that the wheel may be arranged closer to or farther from the front extremity of the plow beam to cause the plow to run steadily.

From the above description it will be apparent that the caster may be vertically adjusted by disengaging the locking-pin from the notch in which it is engaged in the rear side of the standard, and to enable this adjustment to be accomplished from the rear end of the plow-beam, by an operator holding the handles, we provide a wire, O, attached at its front end to said locking-pin and extending to the handles and through a guide-eye or staple on one of the handles and provided with a ring, P.

In operation, when it is desired to elevate or depress the front end of the plow-beam, the locking-pin is disengaged by drawing the operating cord or wire, after which the front end of the beam is moved to the desired elevation by depressing or raising the handles, after which the locking-pin is released and allowed to engage the adjacent notch. This adjustment of the caster-standard may be accomplished while the team is in motion, and without removing the hands from the plow-handles.

Having thus described our invention, what we claim and desire to secure by Letters Patent, is:—

1. The combination with a plow-beam, of a casting or box fixed thereto, a standard slidably fitted in the casting or box and provided with notches, a spring-pressed locking-pin engaging one of said notches, and the caster mounted at the lower end of the standard, substantially as specified.

2. The combination with a plow-beam, of a casting or box E, a notched standard F, slidably fitted in the casting or box and provided at its lower end with a horizontal perforated arm, a caster attached to said arm, a spring-pressed locking-pin mounted in the casting or box to engage the notches in the standard, and an operating cord or wire connected to the locking-pin and extending to the handles of the plow, whereby by means of such cord or wire the standard may be released to allow the front end of the plow-beam to be adjusted by varying pressure upon the handles, substantially as specified.

In testimony that we claim the foregoing as our own we have hereto affixed our signatures in the presence of two witnesses.

HELUM J. WASHBURN.
JOHN F. WASHBURN.

Witnesses:
DWIGHT SANGAR,
GEORGE A. ROBERTS.